Aug. 13, 1957 H. A. STOVER 2,802,979

REMOTE CONTROL SYSTEM

Filed Jan. 4, 1956 3 Sheets-Sheet 1

INVENTOR.
HARRIS A. STOVER
BY Marvin Moody
ATTORNEY

INVENTOR.
HARRIS A. STOVER
BY Marvin Moody
ATTORNEY

Aug. 13, 1957 H. A. STOVER 2,802,979

REMOTE CONTROL SYSTEM

Filed Jan. 4, 1956 3 Sheets-Sheet 3

INVENTOR.
HARRIS A. STOVER
BY Morris Moody
ATTORNEY

United States Patent Office 2,802,979

Patented Aug. 13, 1957

2,802,979

REMOTE CONTROL SYSTEM

Harris A. Stover, Cedar Rapids, Iowa, assignor to Collins Radio Company, Cedar Rapids, Iowa, a corporation of Iowa Application January 4, 1956, Serial No. 557,303

6 Claims. (Cl. 318—467)

Figure 1:
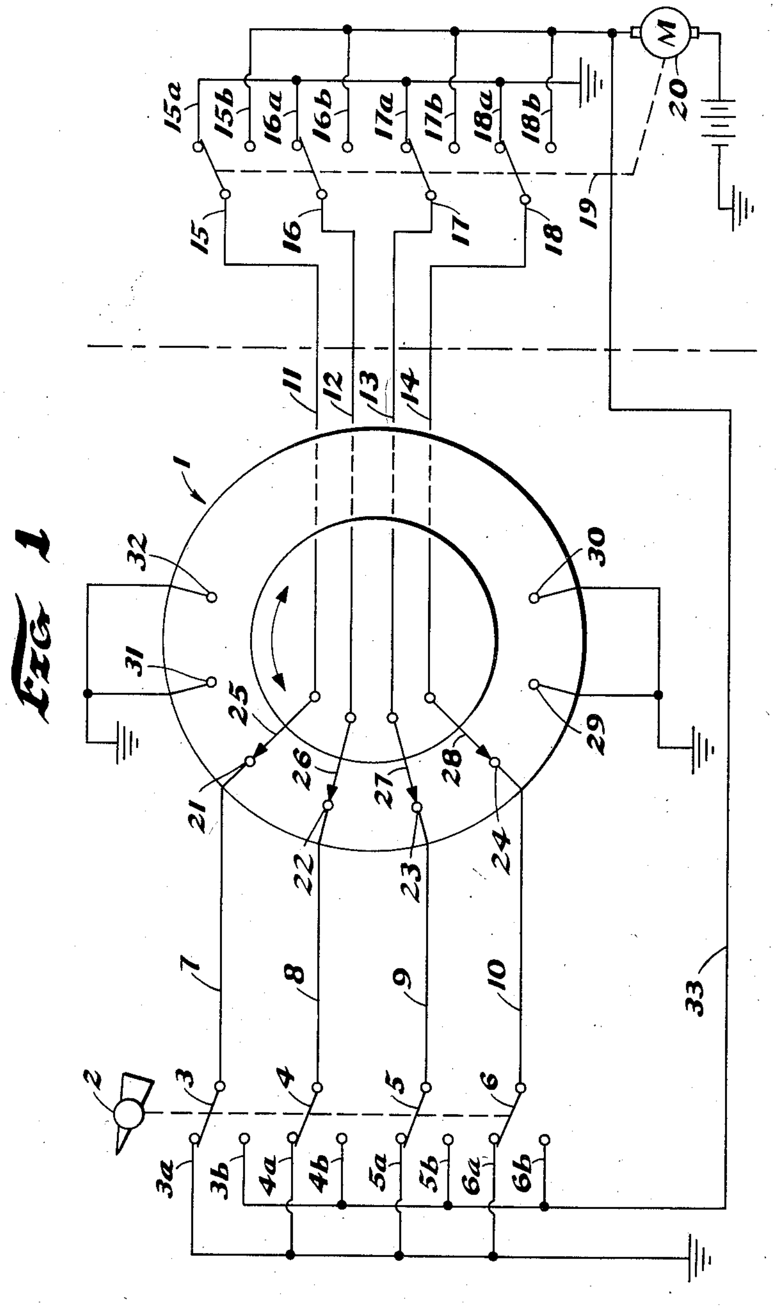

This invention pertains to remote positioning control systems and particularly to systems in which bits of information are transmitted in permutations to a receiving station.

Systems for positioning tuning shafts often use control wires that are connected in permuted combinations so that each combination corresponds to a desired remote position. The savings in wire and space for these systems often provide economies and operational advantages that are not obtained in systems that require a separate control wire for each position. Examples of wire saving schemes are shown in U. S. Patent No. 2,476,673, issued to R. W. May et al., and U. S. Patent No. 2,676,289, issued to Wulfsberg et al. These systems are termed "binary systems" in which two types of information or marks are transmitted over a plurality of wires which are substantially fewer in number than the required positions of the remote tuning shaft. In the May et al. system a control switch is shown permanently wired to a similar switch at the controlled shaft, and in the Wulfsberg et al. system control relays are shown permanently wired to a remote seeking switch. When the switches are wired permanently, a particular position of a control shaft always has a corresponding position for the controlled shaft.

Commonly, radio communication equipment that is to be tuned over a wide frequency range, has different selectable tuning circuits for different frequency bands. If one inductor or capacitor is used for tuning over a plurality of bands, different degrees of shaft rotation are required for each band in order that the same frequency separation is obtained between consecutive channels. For example, if the first band includes the frequency range 400 to 800 kilocycles; the second band from 200 to 400 kilocycles; the third band from 100 to 200 kilocycles; and if a 10-kilocycle separation is required on each band, the first band will require 40 different positions of the tuning shaft; the second band will require 20 different positions; and the third band will require 10 different positions. Therefore, in comparison with the maximum number of positions as required in the first band, the shaft will need to be positioned at every second position for the second band, and at every fourth position for the third band. When an element that is common to different bands is to be remotely tuned for equal frequency changes between channels, a different series of combinations for remote control is required for each band. By properly relating the series to the frequency ranges to be covered, equal channel separation for successive frequency channel selections is obtained. In the present invention an electrical switching element is included for selecting the required series of combinations.

An object of the invention is to provide a switching element for changing positioning sequence in a permutation wire saving remote control system.

A feature of the invention is the simplicity of switching circuits which change permutation as originated by a selector switch to a different desired permutation for transmission to a receiving station.

Figure 2:
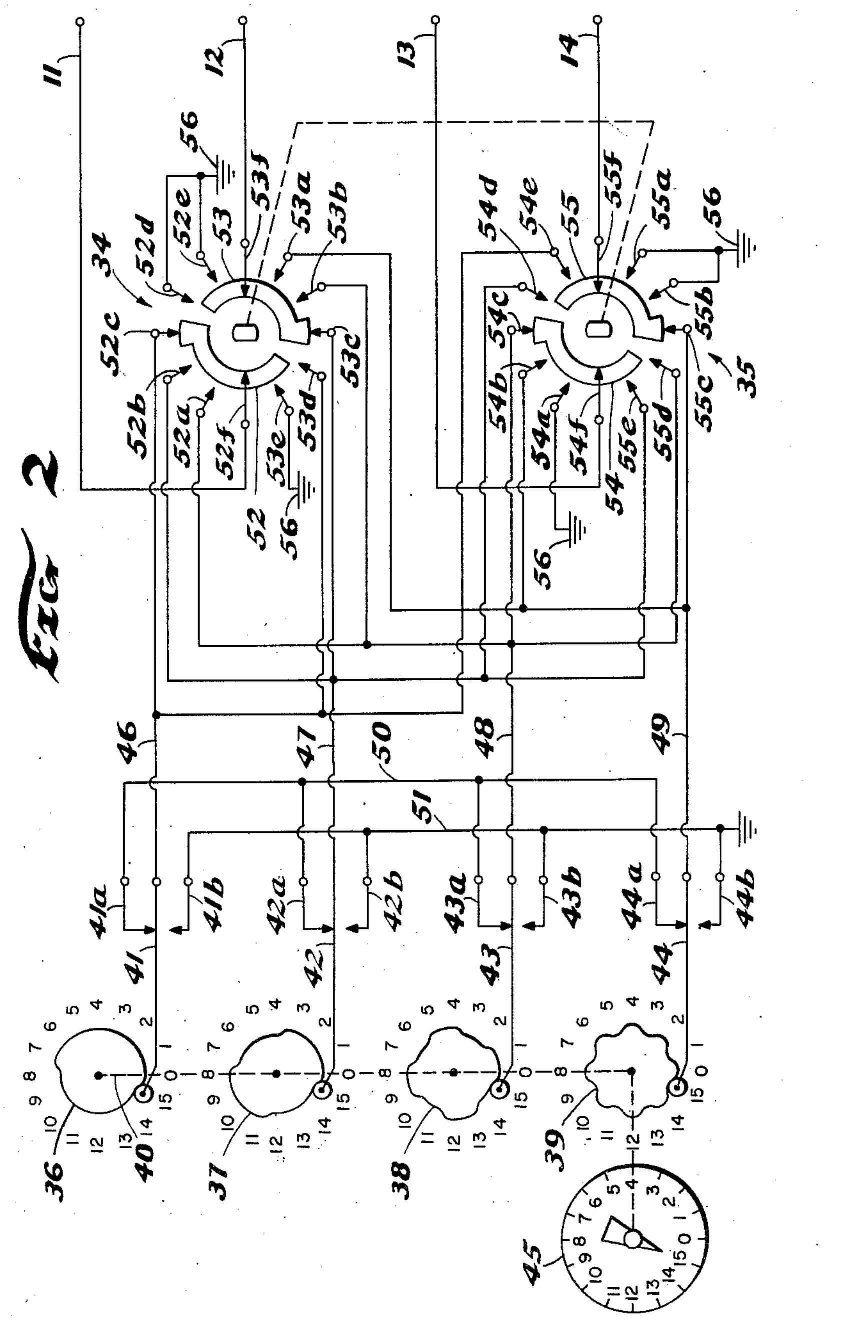

The description of the present invention and appended claims will be better understood with reference to the illustrations, in which:

Figure 1 is a simplified schematic of the invention showing its principle of operation, and Figure 2 is a schematic of a control station in which the permutation switch is applied.

Figure 3:
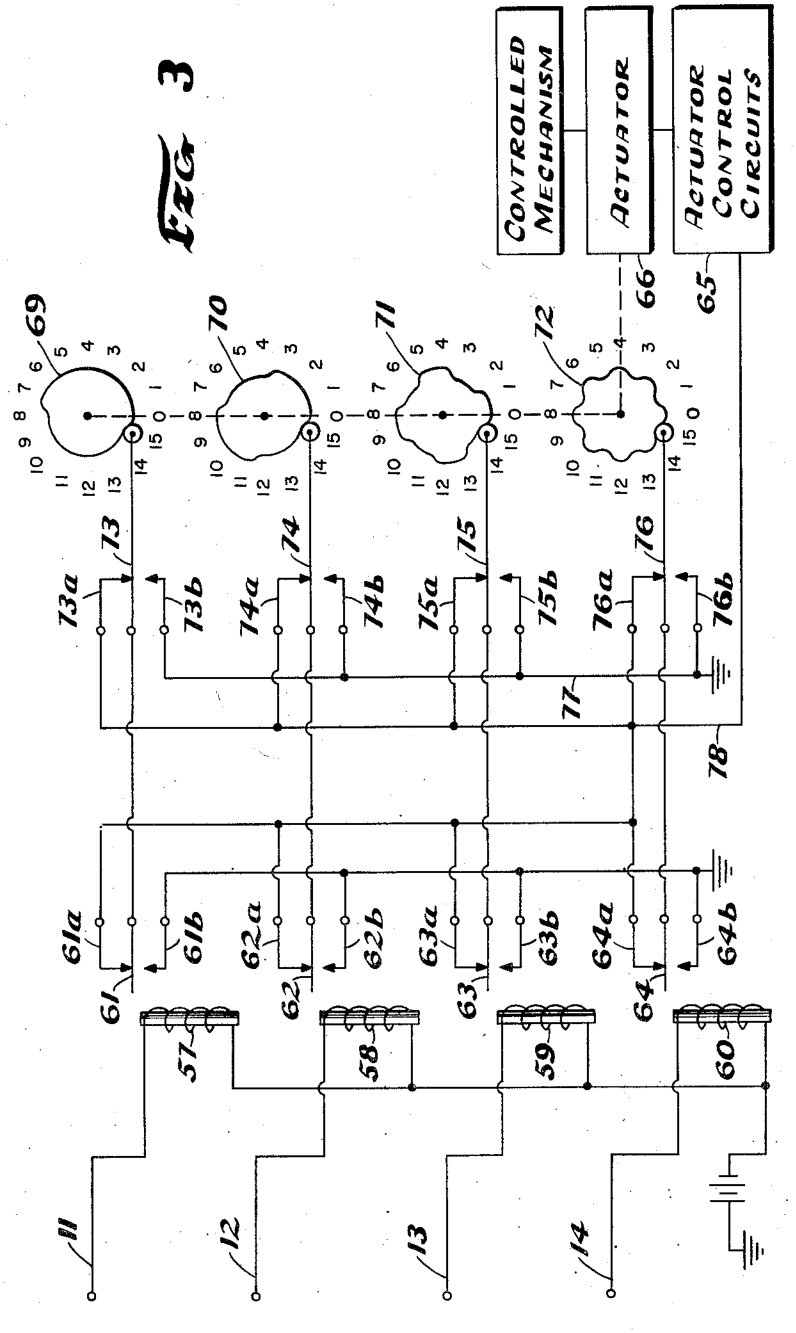

Figure 3 which shows a controlled station, is a continuation of the schematic of Figure 2.

Figure 1 shows a binary control system including the permutation change switch 1. At the left of the dashed line is shown the control station, and at the right the controlled station. Control 2 operates switch armatures 3–6 which are connected to the four conductors 7–10 that extend to the permutation change switch. Each armature is arranged to select one of two marking circuits, in this example a grounded or an ungrounded circuit. Contacts *3a–6a* are grounded, and other contacts *3b–6b* are connected together for either completing a circuit to ground through the seeking switch at the controlled station or for providing an ungrounded circuit. The grounded circuit may be an open circuit providing line 33 is not required. As described hereinafter line 33, which applies motor operating voltage to the ungrounded circuits, is necessary only when all possible positions of the control selection switch are used. The armatures 3–6 are operated by control 2 such that the conductors 7–10 that are connected to the permutation change switch 1 may be connected to the marking circuits in all permuted combinations. When the permutation change switch is in the reference position as shown, the armatures 3–6 are connected through transmission lines 11–14 to armatures 15–18 of a seeking switch at the controlled station. These switches are controlled by shaft 19 through the rotation of motor 20. When armatures 3–6 are connected in this manner through control lines 11–14, the system operates in a manner similar to that described in the above cited May et al. patent.

In a commonly used arrangement of this system the control switch and the seeking switch are identical in their switching operation. Then the position of the control shaft always corresponds to the position of the seeking switch shaft, and the sequence of operation is the same for each shaft. In the May et al. patent cited supra, a combination has been assigned for each shaft position and there is always a direct correspondence in control and controlled shaft positions. In the present invention, facilities are included for changing series of combinations. As in previous systems, for a certain series, the control shaft and controlled shaft positions correspond; but in addition, for other selected series, the controlled shaft positions differ by a predetermined amount. To facilitate changing of combinations as required for one particular application, the combinations as shown in Table I have been assigned for the control shaft positions. Grounded conductors or lines are indicated by "G"; lines that are open circuited, or that have voltage applied through line 33 when it is used, are indicated by a dash (—). The controlled shaft position in this table is obtained when either the permutation change switch 1 of Figure 1 or permutation switches 34 and 35 of Figure 2 are in the positions shown for marking the lines as indicated.

*Table I*

| Control Shaft Position | Transmitted Permutations | | | | Controlled Shaft Position |
|---|---|---|---|---|---|
| | Line 11 | Line 12 | Line 13 | Line 14 | |
| 0 | G | G | G | G | 0 |
| 1 | G | G | G | — | 1 |
| 2 | G | G | — | G | 2 |
| 3 | G | G | — | — | 3 |
| 4 | G | — | G | G | 4 |
| 5 | G | — | G | — | 5 |
| 6 | G | — | — | G | 6 |
| 7 | G | — | — | — | 7 |
| 8 | — | G | G | G | 8 |
| 9 | — | G | G | — | 9 |
| 10 | — | G | — | G | 10 |
| 11 | — | G | — | — | 11 |
| 12 | — | — | G | G | 12 |
| 13 | — | — | G | — | 13 |
| 14 | — | — | — | G | 14 |
| 15 | — | — | — | — | 15 |

When control 2 is operated to select a particular combination listed in Table I, motor 20 operates to drive a remotely driven tuning shaft and also shaft 19 for operating the motor control seeking switches 15–18. The motor continues to operate until the seeking switch is positioned to correspond with control switches 3–6 to remove ground from the motor circuit. In this binary system which utilizes four lines in the switching circuits, the control switch and the motor seeking switch each have sixteen possible positions, and when the permutation switches are in reference positions as shown in Figures 1 and 2, the motor operates until the shaft positions listed in Table I correspond.

Operation of permutation switch 1 of Figure 1 counterclockwise one position connects conductors 8, 9, and 10 through contacts 22, 23, and 24, contacts 25, 26, and 27 to lines 11, 12, and 13 respectively, and connects line 14 through contacts 28 and 29 to a fixed marking circuit which in this instance is a grounded conductor. Particular control shaft positions now obtained for the controlled shaft positions are shown in Table II.

*Table II*

| Control Shaft Position | Transmitted Permutations | | | | Controlled Shaft Position |
|---|---|---|---|---|---|
| | Line 11 | Line 12 | Line 13 | Line 14 | |
| 0 | G | G | G | G | 0 |
| 1 | G | G | — | G | 2 |
| 2 | G | — | G | G | 4 |
| 3 | G | — | — | G | 6 |
| 4 | — | G | G | G | 8 |
| 5 | — | G | — | G | 10 |
| 6 | — | — | G | G | 12 |
| 7 | — | — | — | G | 14 |
| 8 | G | G | G | G | 0 |
| 9 | G | G | — | G | 2 |
| 10 | G | — | G | G | 4 |
| 11 | G | — | — | G | 6 |
| 12 | — | G | G | G | 8 |
| 13 | — | G | — | G | 10 |
| 14 | — | — | G | G | 12 |
| 15 | — | — | — | G | 14 |

The same combinations that are applied by the control switch according to Table I for respective control shaft positions are changed through circuits of the permutation switch to the transmitted permutations shown for control lines 11–14 in Table II and provide the corresponding controlled shaft positions indicated in the last column. As shown in Tables I and II, for control shaft position 0 the controlled shaft position as shown in the last column is zero according to both tables. However, for succeeding control shaft positions the controlled shaft positions as listed in Table II differ from those listed in Table I. According to Table II the control shaft is operated through two positions for each change of position of the control shaft. For instance, the transmitted permutation for control shaft position 1 in Table II is now identical to that for control shaft position 2 in Table I. The controlled shaft now operates through the required number of positions for tuning within a band that has one-half the frequency range of a band that is covered when the permutation switch 1 is in its normal position.

*Table III*

| Control Shaft Position | Transmitted Permutations | | | | Controlled Shaft Position |
|---|---|---|---|---|---|
| | Line 11 | Line 12 | Line 13 | Line 14 | |
| 0 | G | G | G | G | 0 |
| 1 | G | — | G | G | 4 |
| 2 | — | G | G | G | 8 |
| 3 | — | — | G | G | 12 |
| 4 | G | G | G | G | 0 |
| 5 | G | — | G | G | 4 |
| 6 | — | G | G | G | 8 |
| 7 | — | — | G | G | 12 |
| 8 | G | G | G | G | 0 |
| 9 | G | — | G | G | 4 |
| 10 | — | G | G | G | 8 |
| 11 | — | — | G | G | 12 |
| 12 | G | G | G | G | 0 |
| 13 | G | — | G | G | 4 |
| 14 | — | G | G | G | 8 |
| 15 | — | — | G | G | 12 |

Table III shows the transmitted permutations that are applied to lines 11–14 for each control shaft position when the permutation change switch is in its second counterclockwise position. Lines 11 and 12 are now connected to conductors 9 and 10 respectively, and lines 13 and 14 are connected through contacts 27 and 29, and contacts 28 and 30 to the fixed marking circuit which, in this example, is ground. With reference to Table I, the controlled shaft now rotates through four times as many positions for each change in control shaft position as that indicated in Table I, which shows shaft positions for the reference position of the permutation change switch. Therefore, this arrangement is suitable for operating a tuning element when the frequency range of a band is one-fourth of that for the arrangement shown in Table I.

*Table IV*

| Control Shaft Position | Transmitted Permutations | | | | Controlled Shaft Position |
|---|---|---|---|---|---|
| | Line 11 | Line 12 | Line 13 | Line 14 | |
| 0 | G | G | G | G | 0 |
| 1 | G | G | G | G | 0 |
| 2 | G | G | G | — | 1 |
| 3 | G | G | G | — | 1 |
| 4 | G | G | — | G | 2 |
| 5 | G | G | — | G | 2 |
| 6 | G | G | — | — | 3 |
| 7 | G | G | — | — | 3 |
| 8 | G | — | G | G | 4 |
| 9 | G | — | G | G | 4 |
| 10 | G | — | G | — | 5 |
| 11 | G | — | G | — | 5 |
| 12 | G | — | — | G | 6 |
| 13 | G | — | — | G | 6 |
| 14 | G | — | — | — | 7 |
| 15 | G | — | — | — | 7 |

*Table V*

| Control Shaft Position | Transmitted Permutations | | | | Controlled Shaft Position |
|---|---|---|---|---|---|
| | Line 11 | Line 12 | Line 13 | Line 14 | |
| 0 | G | G | G | G | 0 |
| 1 | G | G | G | G | 0 |
| 2 | G | G | G | G | 0 |
| 3 | G | G | G | G | 0 |
| 4 | G | G | G | — | 1 |
| 5 | G | G | G | — | 1 |
| 6 | G | G | G | — | 1 |
| 7 | G | G | G | — | 1 |
| 8 | G | G | — | G | 2 |
| 9 | G | G | — | G | 2 |
| 10 | G | G | — | G | 2 |
| 11 | G | G | — | G | 2 |
| 12 | G | G | — | — | 3 |
| 13 | G | G | — | — | 3 |
| 14 | G | G | — | — | 3 |
| 15 | G | G | — | — | 3 |

Tables IV and V shown transmitted permutations for each control shaft position when the permutation change switch 1 is in its first and second positions clockwise respectively. With reference to Tables I and IV, when the permutation switch is in its first counterclockwise position the controlled shaft must now be operated through two positions in order to operate the control shaft through one position. That is, the controlled shaft will dwell at one position for two successive positions of the control shaft. Likewise, with reference to Table V, the controlled shaft dwells in four positions so that the control shaft must be rotated through four positions in order to move the control shaft one position.

In Figure 2, a permutation change switch consisting of wafers 34 and 35 is inserted in a system derived from the teachings of May et al. and Wulfsberg et al. cited supra. The control station for transmitting shaft positioning information over control lines to the controlled station consists of a transmitting selector switch, marking circuits, and the permutation change switch. The transmitting selector switch consists of rotatable cams 36–39 for operating switch armatures 41–44 respectively. The cams are mounted in a fixed relation to each other on rotatable shaft 40 which is also coupled to control-shaft position indicator 45. The cams are shaped properly to apply permutations to conductors 46–49 as indicated in Table I for lines 11–14 respectively for particular control shaft positions. When a cam is positioned so that a corresponding armature 41–44 contacts the innermost or low portion of the cams, the respective conductor 46–49 is connected through a respective contact 41*a*–44*a* to the background marking circuit 50, but when the cam is positioned so that the armature contacts the high portion of the cam the conductor is connected through a respective contact 41*b*–44*b* to the grounded marking circuit 51. Construction and operation of cam controlled switches and also of alternate wafer switches which may be used for the transmission selector switch are described in the May et al. patent cited supra.

Conductors 46–49, upon which have been applied the permutations listed in Table I, and grounded marking circuits 56 are connected to permutation change switch wafers 34 and 35 for connection to lines 11–14 in different combinations as described for Figure 1. For example, when the permutation change switch is in a second counterclockwise position from that shown, line 11 is connected through common contact 52*f*, switch communtator ring 52, and contact 52*a* to conductor 48; when the switch is in a first counterclockwise position, line 11 is connected through contact 52*b* to conductor 47; when the switch is in a reference position, line 11 is connected through contact 52c to conductor 46; when in a first counterclockwise position, line 11 is connected through contact 52*d* to a grounded marking circuit; and finally, when in a second counterclockwise position line 11 is connected through contact 52*e* to the grounded marking circuit. Likewise, other lines 12, 13 and 14 are connected through respective common contacts 53*f*, 54*f* and 55*f* to contacts that are marked with an "*a*" suffix for the most counterclockwise position and an "*e*" suffix for the most clockwise position. The permutations listed in Table I for particular positions of control shaft 40 are transmitted over lines 11–14 when the permutation change switch wafers 34 and 35 are in the reference position as shown; Table II applies for the first counterclockwise position of the permutation change switch; Table III for the second counterclockwise position; Table IV for the first clockwise position; and Table V for the second clockwise position.

With reference to Figure 3, the function of relays 57—60 operates to control positioning of a remotely controlled shaft as described in the Wulfsberg et al. patent cited supra. When any line 11—14 is grounded through positioning the permutation change switch and the transmission selector switch, the corresponding relay 57—60 operates to pull down a respective armature 61—64. In response to a change in position of any of these armatures, the actuator control circuits 65 start operation of actuator 66. The actuator continues to operate until the cams have positioned switch armatures 73—76 to correspond to the combination applied to conductors 11—14. For example, when only conductor 11 is grounded as shown in Table I for controlled shaft position 7, relay 57 is operated to ground armatures 61 and 73. The actuator will operate as long as armature 73 is upward because a circuit for operating the actuator is completed through contact 73*a*, switch armature 73, relay armature 61, contact 61*b* to ground. Also when only conductor 11 is grounded the actuator will continue to operate as long as any of the other controlled switch armatures 74, 75, and 76 are in a downward position. For example, when armature 74 is downward, a circuit is completed from grounded conductor 77, contacts 74*b*, switch armature 74, relay armature 62, and contact 62*a* to actuator control circuits 65. In a like manner when the lines 11—14 are grounded in other combinations, the actuator will drive the cams 69—72 to that single position in which the downwardly positioned armatures correspond to the grounded lines.

Relays 57, 58, 59, and 60 need not be included, providing the number of usable combinations is reduced from 16 to 15, or providing another line is added for completing an additional circuit between the control and the controlled station. When the relays are removed, lines 11—13 are connected to corresponding seeking switch armatures 73—76 respectively. Without either relays or an additional line, controlled shaft position 0 which is obtained when the four lines 11—14 are grounded, is not usable, because actuator 66 is completely disconnected from the control circuits. To operate the actuator off this position, a line that corresponds to line 33, shown in Figure 1, is added to connect actuator control conductor 78 to the conductor 50 that connects together the ungrounded contacts of the transmission selector switch.

The present invention has been described with reference to a binary system having four wires, but the permutation change feature is applicable to other binary systems having $n$ wires as required, such that the number of remote positions does not exceed $2^n$. A permutation change switch could also be incorporated in systems that have more than two selectable marking circuits for each transmission line such as a trinary system.

The system described herein is adaptable for use in remote tuning systems that afford selection of equally spaced frequency channels in different frequency bands. The permutation change switch may be operated in conjunction with the band switch in the tuning system to change the tuning rate as required within the selected band. Since the different selectable frequency bands are harmonically related in many systems, and since the degrees of rotation of a tunning shaft for obtaining equal frequency separation between channels vary inversely with this harmonic relation, the tuning shaft may be operated by an actuator that is coupled to the controlled seeking switch in this invention.

Although this invention has been described with respect to a particular embodiment thereof, it is not to be so limited, as changes and modifications may be made therein which are within the full intended scope of the invention as defined by the appended claims.

I claim:

1. In a wire saving remote positioning system including a plurality of first electrical conductors, a plurality of different electrical marking circuits, a transmission selector switch having a plurality of positions for connecting said conductors to different ones of said marking circuits, thereby obtaining electrical permuted combinations on said conductors, a permutation change switch, a plurality of lines connected to said permutation change switch, second conductors connecting said permutation switch directly to a particular one of said marking circuits, said permutation change switch when in a reference position connecting each of said lines to selected individual ones of said first conductors, and said permutation switch when in other positions connecting certain ones of said lines individually to certain ones of said first conductors and individually to said second conductors, whereby for different positions of said permutation switch different predetermined sequences of combinations are applied to said lines in response to the operation of said transmission selector switch through a certain sequence of positions.

2. In a shaft positioning system having a control station and a controlled station, a plurality of lines interconnecting said stations, a plurality of electrical circuits with different electrical conditions, means for connecting said electrical circuits in different combinations, means for selecting said combinations individually in a particular sequence for application to said lines, a shaft at said controlled station having a predetermined position for each of said combinations, an actuator for positioning said shaft, means responsive to the selection of any one of said combinations for operating said actuator until said shaft is in a corresponding position, a permutation change switch having an individual section for each of said lines, each section being connected serially therewith, said switch having a plurality of positions, each position for connecting said lines in a different order to said electrical circuits so that a different sequence of combinations is applied to said lines for each different position of said switch, and said shaft operated through a different sequence of positions for each position of said permutation change switch.

3. A remote positioning system having a control station and a controlled remote mechanism, said control station having a plurality of conductors, and a permutation change switch for selecting said conductors, said remote mechanism having a predetermined number of selectable positions, a plurality of lines extending between said control station and said remote mechanism to connect said permutation change switch to said remote mechanism, means at said control station for applying to said conductors a predetermined number of permuted electrical combinations in a particular sequence, said remote mechanism having a position corresponding to each of said combinations, said permutation change switch operable to different positions for connecting different ones of said conductors individually to different ones of said lines so that the sequence of combinations as applied to said lines from said conductors is different for each position of said permutation switch, and means responsive to a change of combination of said lines for operating said remote mechanism until its position corresponds to the combination applied to said lines.

4. A remote positioning system as defined in claim 3 wherein a change in position of said permutation change switch causes a 2:1 change in ratio between the number of combinations that are applied in a particular sequence to said conductors and the number of predetermined positions through which said remote controlled mechanism is operated.

5. Remote control shaft positioning system comprising a controlled station for positioning the shaft to any one of a series of selected positions, a controlling station for selecting any one of said positions, a plurality of control wires interconnecting the controlling and controlled stations, a number of first sets of switching contacts for the controlling station, there being one set for each of said control wires, an equal number of second sets of switching contacts for the controlled station, said second sets being coupled to said shaft to be positioned, selecting means for operating said first switching contacts in different combinations to apply different electrical combinations to said control wires, said second sets operative for obtaining combinations corresponding to the combinations on said control wires, means responsive to a change in combination on said control wires for operating said shaft until the combinations on said second contacts and on said control wires correspond, and switching means operative to different positions for connecting different ones of said control wires individually to different ones of said first set of contacts, whereby said first set of contacts when operated through a certain sequence of combinations applies to said control wires electrical combinations that are arranged in a different predetermined sequence for each different position of said switching means.

6. A remote control positioning system comprising a control station and a controlled station, said control station having a transmitting selector switch operable over a predetermined number of settings, a permutation change switch with a reference position and a plurality of other positions, a plurality of first conductors connecting said selector switch to said change switch, a plurality of marking circuits selectable by said selector switch, said selector switch operable over a predetermined number of settings for connecting said marking circuits to said first conductors in permuted combinations so that each setting corresponds to a particular combination, and second conductors connecting one of said marking circuits to said permutation change switch; said controlled station having a seeking switch with a position corresponding to each of said combinations, an actuator for operating said seeking switch, and control circuits connected to said seeking switch for controlling the operation of said actuator; a plurality of lines extending between said control station and said controlled station to interconnect said permutation change switch and said seeking switch, said permutation change switch when in said reference position connecting said lines individually to said first conductors, said permutation change switch when in remaining positions connecting certain ones of said lines individually to certain ones of said first conductors and individually to certain ones of said second conductors, whereby for each position of said permutation change switch a different sequence of combinations is applied to said lines in response to the operation of said transmitting selector switch through a particular sequence of settings, and said control circuits responsive to a change in combination on said lines for operating said actuator until the position of said seeking switch corresponds to the combination applied to said lines.

References Cited in the file of this patent

UNITED STATES PATENTS 2,676,289 Wulfsberg et al. -------- Apr. 20, 1954